United States Patent
Ooyama et al.

(10) Patent No.: US 7,556,762 B2
(45) Date of Patent: Jul. 7, 2009

(54) METHOD OF INFLATION EXTRUSION MOLDING, EXTRUSION MOLDING APPARATUS THEREFOR, AND PROCESS FOR PRODUCING PRESSURE-SENSITIVE ADHESIVE SHEET

(75) Inventors: Kooki Ooyama, Osaka (JP); Masayoshi Natsume, Osaka (JP); Keiji Hayashi, Osaka (JP); Tadao Torii, Osaka (JP)

(73) Assignee: Nitto Denko Corporation, Osaka (JP)

( * ) Notice: Subject to any disclaimer, the term of this patent is extended or adjusted under 35 U.S.C. 154(b) by 828 days.

(21) Appl. No.: 10/942,139

(22) Filed: Sep. 16, 2004

(65) Prior Publication Data

US 2005/0056973 A1    Mar. 17, 2005

(30) Foreign Application Priority Data

Sep. 17, 2003    (JP)    ............ P.2003-324534

(51) Int. Cl.
*B29C 53/16* (2006.01)
(52) U.S. Cl. ............ 264/514; 264/566; 425/326.1
(58) Field of Classification Search ......... 264/514, 264/566; 425/326.1
See application file for complete search history.

(56) References Cited

U.S. PATENT DOCUMENTS

| | | | | |
|---|---|---|---|---|
| 3,157,720 A | * | 11/1964 | Ahlich et al. | 264/566 |
| 3,311,682 A | * | 3/1967 | Ringley et al. | 264/559 |
| 3,315,608 A | * | 4/1967 | Wain et al. | 425/66 |
| 3,355,531 A | * | 11/1967 | Barnhart et al. | 264/566 |
| 3,749,540 A | * | 7/1973 | Upmeier | 425/326.1 |
| 3,775,523 A | * | 11/1973 | Haley | 264/569 |
| 4,068,999 A | * | 1/1978 | Dawson | 425/392 |
| 4,355,966 A | * | 10/1982 | Sweeney et al. | 425/140 |
| 4,533,309 A | * | 8/1985 | Planeta | 425/326.1 |
| 4,749,346 A | * | 6/1988 | Planeta | 425/72.1 |
| 5,089,320 A | * | 2/1992 | Straus et al. | 428/216 |
| 5,912,021 A | * | 6/1999 | Planeta | 425/72.1 |

FOREIGN PATENT DOCUMENTS

| | | |
|---|---|---|
| JP | 50-20578 B | 7/1975 |
| JP | 60-262618 A | 12/1985 |
| JP | 6-143411 A | 5/1994 |
| KR | 95-3316 | 2/1995 |
| KR | 20-0154649 | 8/1999 |

OTHER PUBLICATIONS

Korean Office Action dated Oct. 26, 2006.
Chinese Office Action dated May 12, 2006.

* cited by examiner

*Primary Examiner*—Robert B Davis
(74) *Attorney, Agent, or Firm*—Sughrue Mion, PLLC

(57) ABSTRACT

The invention provides a method of inflation extrusion molding, comprising: introducing one or more resin materials extruded from one or more extruders into a die; subsequently extruding the resin material(s) from the die and inflating the extrudate into a cylindrical shape having a predetermined diameter by blown-film extrusion; and then passing the cylindrical inflated resin material through a space between stabilizers which face each other at a predetermined angle, to deform the cylindrical resin material into a flat tube shape having an elongated elliptic section, thereby producing a film or sheet having a predetermined width, wherein the deformation of the cylindrical inflated resin material into a flat tube shape having an elongated elliptic section is assisted by a guide device to thereby facilitate the deformation.

8 Claims, 3 Drawing Sheets mation of

METHOD OF INFLATION EXTRUSION MOLDING, EXTRUSION MOLDING APPARATUS THEREFOR, AND PROCESS FOR PRODUCING PRESSURE-SENSITIVE ADHESIVE SHEET

FIELD OF THE INVENTION

The present invention relates to a method of the inflation extrusion molding of a single- or multilayered film or sheet, an apparatus for the molding, and to a process for producing a pressure-sensitive adhesive sheet with these.

BACKGROUND OF THE INVENTION

Processes for film or sheet production by inflation extrusion molding have hitherto been used extensively because films or sheets can be efficiently produced by the processes. However, in the case where a pressure-sensitive adhesive sheet or tape or the like which has a pressure-sensitive adhesive layer on one side is produced by inflation extrusion molding, the following trouble arises. When a pressure-sensitive adhesive sheet which has been extruded from an extruder and inflated into a cylindrical shape is transferred, while being flattened, with stabilizers constituted by guide rollers arranged in rows, then the pressure-sensitive adhesive layer on one side of the pressure-sensitive adhesive sheet sticks to the guide rollers and, hence, the length over which the sheet being transferred is in contact with the guide rollers fluctuates. Because of this, the pressure-sensitive adhesive sheet moves intermittently between the stabilizers and this may result in surface waviness or wrinkles of the pressure-sensitive adhesive sheet.

There is hence a technique in which the surfaces of the guide rollers constituting stabilizers are coated with Teflon to diminish the sticking of pressure-sensitive adhesive layers (see, for example, patent document 1).

Patent Document 1: JP 50-020578 B

However, in the case where a long guide roller is used as each of the guide rollers constituting the stabilizers, the direction of rotation of the guide rollers do not coincide with the direction of resin material spreading when the resin material which has been inflated into a cylindrical shape by blown-film extrusion is folded so as to have an elliptic section. Because of this, even when the surfaces of the guide rollers have been coated with Teflon or the like, the resin material shakes undesirably and is not smoothly spread into a flat tube shape having an elliptic section, resulting in the occasional occurrence of folding wrinkles.

Especially in the case of sheets or films having a pressure-sensitive adhesive layer formed on one side, such as pressure-sensitive adhesive sheets, it has become difficult to cope with the recent pressure-sensitive adhesive layers of various kinds with the mere coating of the surfaces of the guide rollers constituting stabilizers with Teflon or the like as shown in patent document 1. Namely, the mere coating of the surfaces of the guide rollers constituting stabilizers with Teflon or the like as shown in patent document 1 is ineffective in preventing sticking to the guide rollers when the pressure-sensitive adhesive layer formed has high pressure-sensitive adhesive properties, and it is difficult with this technique to fold the cylindrical inflated pressure-sensitive adhesive sheet into a flat tube shape having an elongated elliptic section with avoiding the occurrence of wrinkles or the like on the sheet surface.

SUMMARY OF THE INVENTION

Accordingly, an object of the invention is to provide a method of inflation extrusion molding by which a resin material, e.g., a pressure-sensitive adhesive sheet, extruded by blown-film extrusion can be easily deformed into a flat tube shape having an elongated elliptic section and can be inhibited from developing wrinkles or the like upon folding. Another object of the invention is to provide an extrusion molding apparatus for use in the method.

Other objects and effects of the invention will become apparent from the following description.

The invention has been achieved in order to overcome the problems described above. The invention provides a method of inflation extrusion molding, comprising:

introducing one or more resin materials extruded from one or more extruders into a die;

subsequently extruding the resin material(s) from the die and inflating the extrudate into a cylindrical shape having a predetermined diameter by blown-film extrusion; and then passing the cylindrical inflated resin material through a space between stabilizers which face each other at a predetermined angle, to deform the cylindrical resin material into a flat tube shape having an elongated elliptic section, thereby producing a film or sheet having a predetermined width, wherein the deformation of the cylindrical inflated resin material into a flat tube shape having an elongated elliptic section is assisted by a guide device to thereby facilitate the deformation.

When a resin material which has been extruded and inflated into a cylindrical shape having a predetermined diameter by blown-film extrusion is deformed between stabilizers into a flat tube shape having an elongated elliptic section, then the guide device serves to reduce the force which restrains the resin material from deforming into a flat tube shape having an elongated elliptic section. The film or sheet which has passed through the space between the stabilizers is hence inhibited from occasionally generating wrinkles upon folding, and a high-quality film or sheet having a predetermined width can be stably produced.

In a preferred embodiment of the method of inflation extrusion molding according to the invention, the stabilizers comprise roller members arranged in rows and the roller members each are arranged so that the direction of rotation thereof is substantially the same as the direction in which the resin material is spread when deformed into a flat tube shape having an elongated elliptic section, to thereby serve as the guide device.

Since the stabilizers are constituted by roller members arranged in rows, the frictional resistance in the direction in which the extruded resin advances is reduced. Furthermore, since the roller members each are arranged so that the direction of rotation thereof is substantially the same as the direction in which the resin material is spread when deformed into a flat tube shape having an elongated elliptic section, the deformation to a flat tube shape having an elongated elliptic section can be conducted more easily. Consequently, the occurrence of wrinkles during folding can be inhibited with higher certainty.

Furthermore, in the method of inflation extrusion molding according to the invention, the roller members each preferably comprise a plurality of rollers arranged in a row.

Since the roller members constituting the stabilizers each comprise a plurality of short rollers arranged in a row, the regions where these roller members come into contact with a resin material do not have a large area and, hence, the resistance of friction between the roller members and the resin material can be reduced.

The invention further provides an apparatus for inflation extrusion molding, comprising:

a die into which one or more resin materials extruded from one or more respective extruders are introduced, and subsequently from which the introduced one or more resin materials are extruded and inflated into a cylindrical shape having a predetermined diameter by blown-film extrusion; and stabilizers facing each other at a predetermined angle and defining a space therebetween through which the cylindrical inflated resin material is passed to be deformed into a flat tube shape having an elongated elliptic section, thereby producing a film or sheet having a predetermined width, wherein the stabilizers comprise roller members arranged in rows, and the roller members each have been arranged so that the direction of rotation thereof is substantially the same as the direction in which the cylindrical inflated resin material is spread when deformed into a flat tube shape having an elongated elliptic section.

When a resin material which has been extruded and inflated into a cylindrical shape having a predetermined diameter by blown-film extrusion is deformed between stabilizers into a flat tube shape having an elongated elliptic section, then the guide device serves to reduce the force which restrains the resin material from deforming into a flat tube shape having an elongated elliptic section. The film or sheet which has passed through the space between the stabilizers is hence inhibited from occasionally generating wrinkles upon folding, and a high-quality film or sheet having a predetermined width can be stably produced. In addition, since the stabilizers are constituted by roller members arranged in rows, the frictional resistance in the direction in which the extruded resin advances is reduced. Furthermore, since the roller members each are arranged so that the direction of rotation thereof is substantially the same as the direction in which the resin material is spread when deformed into a flat tube shape having an elongated elliptic section, the deformation to a flat tube shape having an elongated elliptic section can be conducted more easily.

Consequently, the occurrence of wrinkles during folding can be inhibited with higher certainty.

In the apparatus for inflation extrusion molding according to the invention, the roller members arranged in rows are preferably arranged so as to give a gap between adjacent roller members of not larger than the diameter of each roller member.

Since the roller members are arranged so as to give a gap between adjacent roller members of not larger than the diameter of each roller member, the resin material can be prevented from coming into the space between adjacent roller members. The film or sheet thus produced can hence be inhibited from developing surface wrinkles.

In the apparatus for inflation extrusion molding according to the invention, the roller members each preferably comprise a plurality of rollers arranged in a row.

Since the roller members constituting the stabilizers each comprise a plurality of short rollers arranged in a row, the regions where these roller members come into contact with a resin material do not have a large area and, hence, the resistance of friction between the roller members and the resin material can be reduced.

The invention furthermore provides a process for producing a pressure-sensitive adhesive sheet, comprising:

extruding a resin material for forming a pressure-sensitive adhesive layer and a resin material for forming a substrate from respective separate extruders;

introducing the extrudates into a single die;

subsequently extruding the introduced resin materials together from the die;

inflating the extrudate into a cylindrical shape having a predetermined diameter by blown-film extrusion; and then passing the cylindrical inflated resin materials through a space between stabilizers which face each other at a predetermined angle, to deform the cylindrical materials into a flat tube shape having an elongated elliptic section, thereby producing a pressure-sensitive adhesive sheet having a predetermined width, wherein the deformation of the cylindrical inflated resin materials into a flat tube shape having an elongated elliptic section is assisted by a guide device to thereby facilitate the deformation.

When resin materials for forming a pressure-sensitive adhesive layer and a substrate, respectively, which have been extruded and inflated into a cylindrical shape having a predetermined diameter by blown-film extrusion are deformed between stabilizers into a flat tube shape having an elongated elliptic section, then the guide device serves to reduce the force which restrains the resin materials for forming a pressure-sensitive adhesive layer and a substrate from deforming into a flat tube shape having an elongated elliptic section. The pressure-sensitive adhesive sheet which has passed through the space between the stabilizers is hence inhibited from occasionally generating wrinkles upon folding. Thus, a high-quality pressure-sensitive adhesive sheet having a predetermined width can be stably produced.

In the process for producing a pressure-sensitive adhesive sheet according to the invention, it is preferred that the stabilizers comprise roller members arranged in rows and the roller members each are arranged so that the direction of rotation thereof is substantially the same as the direction in which the resin material is spread when deformed into a flat tube shape having an elongated elliptic section, to thereby serve as the guide device.

Since the stabilizers are constituted by roller members arranged in rows, the frictional resistance in the direction in which the extruded resin advances is reduced. Furthermore, since the roller members each are arranged so that the direction of rotation thereof is substantially the same as the direction in which the resin material is spread when deformed into a flat tube shape having an elongated elliptic section, the deformation to a flat tube shape having an elongated elliptic section can be conducted more easily. Consequently, the occurrence of wrinkles during folding in the formation of a pressure-sensitive adhesive sheet can be inhibited with higher certainty even when the pressure-sensitive adhesive layer comes into contact with the stabilizers.

Furthermore, in the process for producing a pressure-sensitive adhesive sheet according to the invention, the roller members each preferably comprise a plurality of rollers arranged in a row.

Since the roller members constituting the stabilizers each comprise a plurality of short rollers arranged in a row, the regions where these roller members come into contact with a resin material do not have a large area and, hence, the resistance of friction between the roller members and the resin material can be reduced. Because of this, even a pressure-sensitive adhesive sheet, which includes a pressure-sensitive adhesive layer, can be easily and stably formed in a wrinkle-free state.

The invention, which has the constitutions described above, brings about the following effects. When a pressure-sensitive adhesive sheet or resin material which has been inflated into a cylindrical shape by blown-film extrusion is deformed into a flat tube shape having an elongated elliptic section, stabilizers are used for sandwiching and pressing the cylindrical inflated resin material and deforming it into a flat tube shape having an elongated elliptic section. The stabilizers are constituted by roller members arranged in rows and these roller members each are constituted by a plurality of short rollers rotating in a direction substantially the same as the direction in which the resin material expands and spreads. Due to this constitution, the frictional resistance of contact with the rollers, which restrains the resin material from spreading into a flat tube shape having an elongated elliptic section, is reduced and the resin material can be easily deformed into a flat tube shape having an elongated elliptic section. Because of this, the method of inflation extrusion molding can inhibit generation of wrinkles even in the extrusion molding of a pressure-sensitive adhesive sheet having a pressure-sensitive adhesive layer on one side, not to mention in the inflation extrusion molding of various resin materials.

Figure 1:
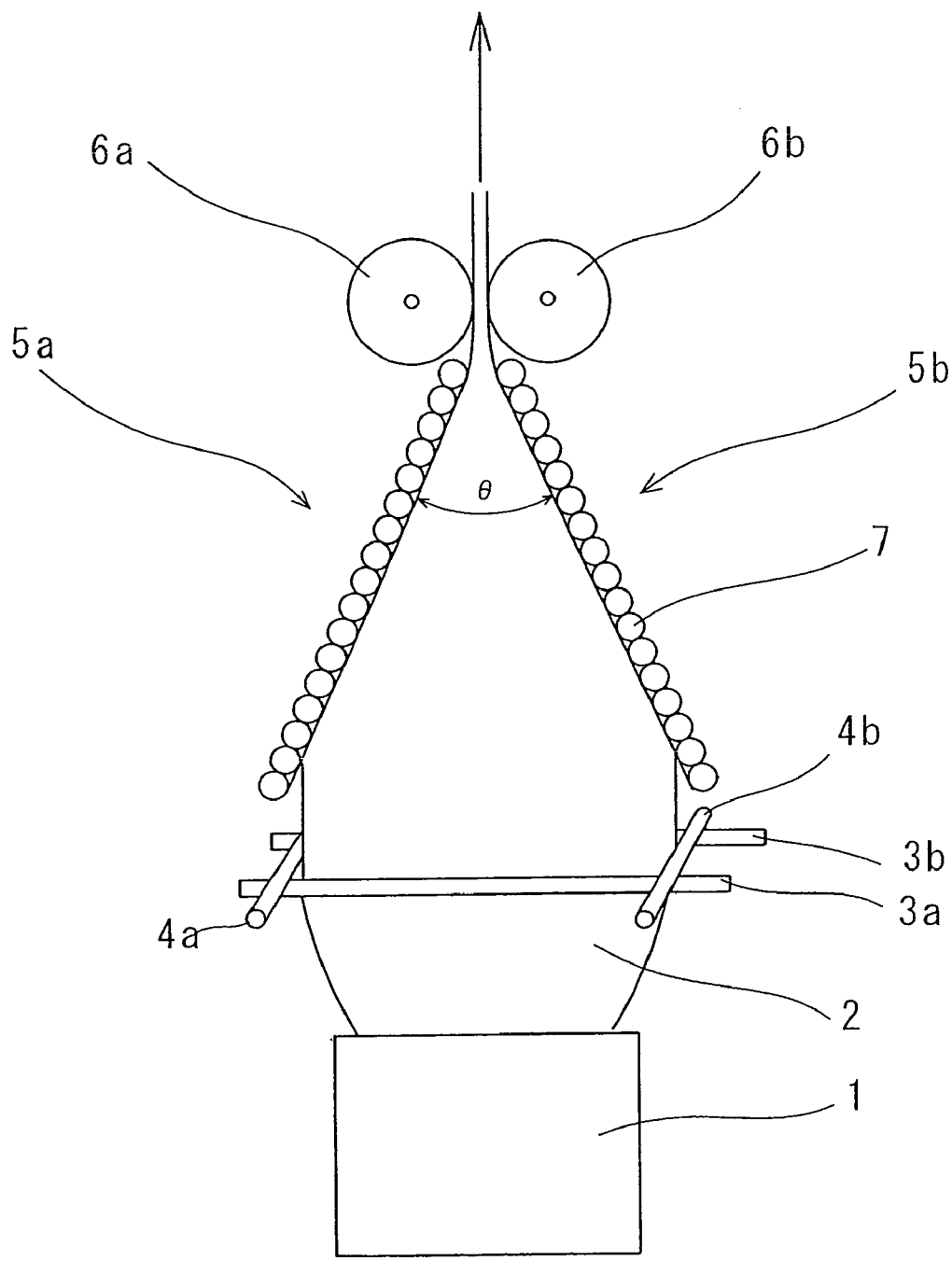
FIG. 1 is a diagrammatic view of one embodiment of the apparatus for inflation extrusion molding according to the invention.

The reference numerals and signs used in the drawings denote the followings, respectively.
  θ: angle of aperture
  α: angle of inclination
  1: die
  2: resin material
  3a, 3b, 4a and 4b: regulating member
  5a and 5b: stabilizer
  6a, 6b: pinch roller
  7: roller member
  8: roller (short)
  9: roller (long)

DETAILED DESCRIPTION OF THE INVENTION

Embodiments of the method of inflation extrusion molding according to the invention will be explained below by reference to the drawings.

FIG. 1 is a diagrammatic view illustrating an embodiment of the method of inflation extrusion molding. In FIG. 1, numeral 1 denotes a die into which one or more resin materials extruded from one or more extruders not shown are introduced. The die 1 has, formed therein, one or more passages for the resin material(s) to be introduced from one or more extruders, although the passages are not shown. The die has concentrically arranged ejection openings through which the resin materials introduced into the die are ejected. In the case where a pressure-sensitive adhesive sheet is formed, a resin material for forming a pressure-sensitive adhesive layer and a resin material for forming a substrate are introduced into the respective passages so that the former and latter resin materials will constitute an outer layer and an inner layer, respectively. The disposition of the substrate-forming resin material so as to constitute an inner layer is intended to locate the substrate part inside when the flat tube shape having an elongated elliptic section is folded, as will be described later.

In FIG. 1, numeral 2 denotes a resin material which has been extruded and ejected from the die 1 through an ejection opening and inflated into a cylindrical shape having a predetermined diameter. Symbols 3a, 3b, 4a, and 4b denote regulating members by which the resin material ejected from the die 1 is positioned so as not to shift back, forth, right, or left. Due to these regulating members 3a, 3b, 4a, and 4b, the cylindrical inflated resin material can continuously move upward without undergoing such horizontal shifting.

Symbols 5a and 5b denote stabilizers which are disposed symmetrically about a vertical plane so as to face each other at a predetermined angle and which serve to deform the cylindrical inflated resin material 2 into a flat tube shape having an elongated elliptic section. Symbols 6a and 6b denote pinch rollers by which the resin material which has passed through the space between the stabilizers 5a and 5b and folded is sent to a take-up roller or the like not shown. The angle of aperture θ between the stabilizers 5a and 5b preferably is appropriately selected according to the viscosity of the resin material 2, and it is necessary for the selection to take account of the gradient at which the cylindrical inflated resin material 2 is deformed between the stabilizers 5a and 5b, the area of contact with the stabilizers 5a and 5b, etc. It is preferred that the angle of aperture θ be regulated to a value in the range of 10° to 45°, preferably 10° to 30°, more preferably 10° to 25°.

As shown in FIG. 1, the stabilizers 5a and 5b have been disposed so as to face each other at a predetermined angle so that the passage of the resin material which has been ejected from the die 1 and inflated into a cylindrical shape is narrowed along the direction of forward movement of the resin material and that the cylindrical inflated resin material can be thus deformed into a flat tube shape having an elongated elliptic section. These stabilizers 5a and 5b are constituted by roller members 7 arranged in rows. These roller members 7 are arranged with an appropriate pitch H so as to give a gap h between adjacent roller members of not larger than the diameter of each roller member 7. Because of this constitution, the resin material 2 which is moving forward while being in contact with these roller members 7 does not come into the space between adjacent roller members 7 during the movement. As a result, the resin material 2 is inhibited from developing surface wrinkles and can be made even in thickness, etc.

Figure 2:
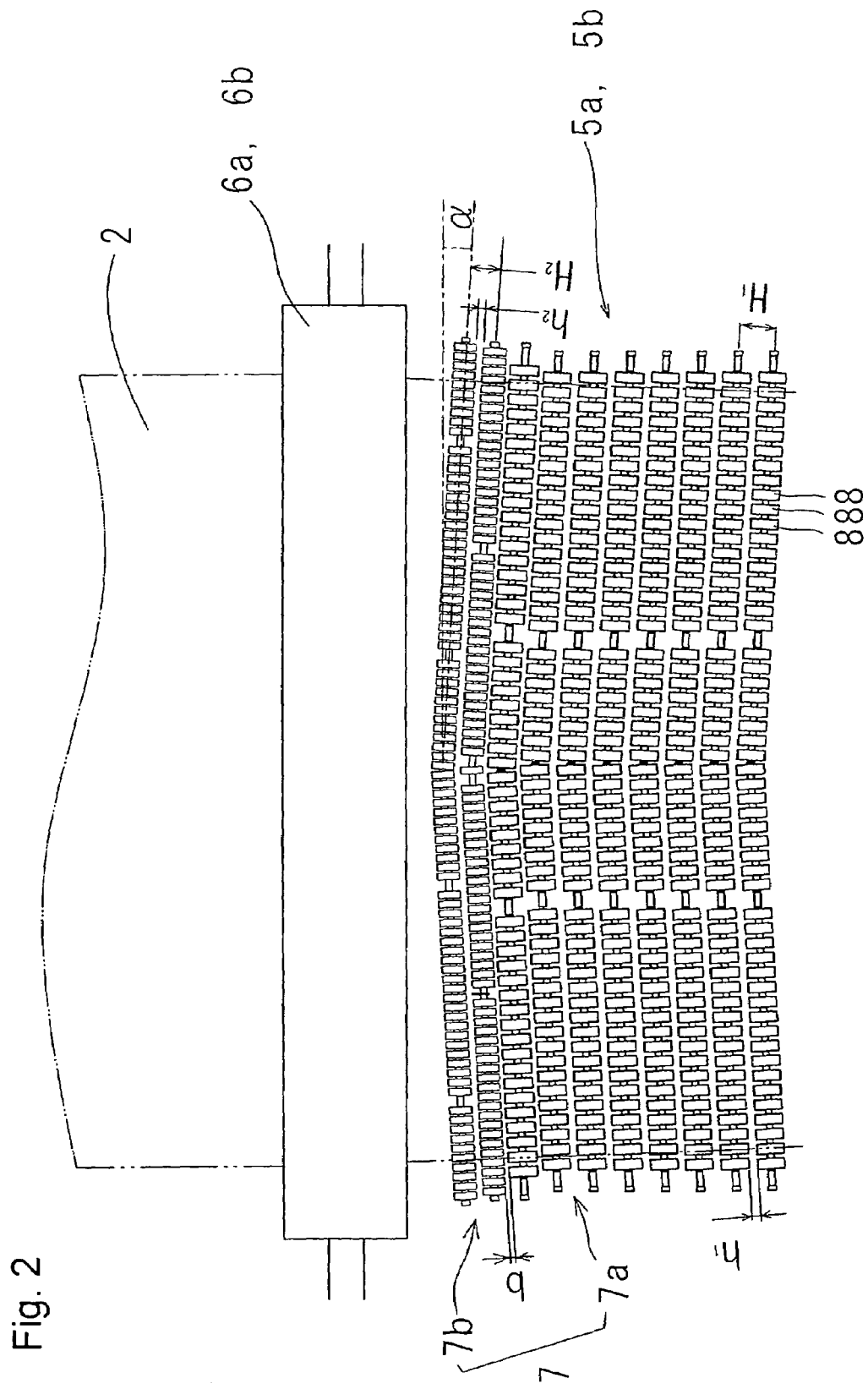
FIG. 2 is a diagrammatic view of one embodiment of the stabilizers in the apparatus for inflation extrusion molding according to the invention.

As shown in FIG. 2, the roller members 7 are disposed so as to be inclined at a predetermined angle and protrude upward at the center of each of the stabilizers 5a and 5b. The roller members 7 thus arranged hence function as a guide device for deforming the cylindrical inflated resin material 2 into a flat tube shape having an elongated elliptic section. The angle of inclination α of these roller members 7 is determined by the width of the resin material 2 deformed into a flat tube shape having an elongated elliptic section and by the paths of the edges of the traveling resin material 2 which are given by the angle of aperture θ between the stabilizers 5a and 5b. Thus, the direction of rotation of each roller member 7 can be made substantially the same as the direction in which the resin material 2 inflated into a cylindrical shape is spread when deformed into a flat tube shape having an elongated elliptic section. Since the stabilizers 5a and 5b are thus constituted by the roller members 7 arranged in rows, the resin material 2 extruded from the die 1 comes into contact with the stabilizers 5a and 5b not by areal contact but by intermittent linear contact, whereby the frictional resistance in the direction of forward movement of the resin material 2 is reduced. Furthermore, since the roller members 7 have been arranged so that the direction of rotation thereof is substantially the same as the direction in which the resin material is spread when deformed into a flat tube shape having an elongated elliptic section, not only the frictional resistance which restrains the resin material 2 from spreading is reduced but also the resin material 2 which is moving forward can be inhibited from shaking. As a result, the resin material 2 can be stably sent to the nip between the pinch rollers 6a and 6b and can be more easily deformed into a flat tube shape having an elongated elliptic section. Consequently, the occurrence of wrinkles during folding can be inhibited with higher certainty.

Furthermore, the roller members 7 arranged in rows each are constituted by a plurality of short rollers 8, 8, . . . arranged in a row, as shown in FIG. 2. Due to this constitution, those regions of these roller members 7 in which the resin material 2 comes into contact with the roller members do not make continuous lines but broken lines, resulting in reduced resistance of friction between the resin material 2 and the roller members 7. Consequently, the occasional occurrence of wrinkles during folding can be inhibited without fail. These plural short rollers 8, 8, . . . preferably have a reduced area of contact with the resin material 2 as described above, and each preferably have a width of 10-15 mm. It is also preferred that the rollers 8, 8, . . . adjacent in the respective row be arranged as close as possible to each other. The roller width and the space between rollers adjacent in the respective row are not limited, and it is preferred to appropriately select these taking into account the viscosity of the resin material 2, etc.

It is further preferred that the plural short rollers 8, 8, . . . in each roller member 7 be disposed so as to form a zigzag arrangement with the plural short rollers 8, 8, . . . of other rows. When this roller arrangement is employed, the regions where the roller members 7 come into contact with the resin material 2 are not continuous and, hence, a reduction in frictional resistance is attained. For example, even in the case of a resin material having a pressure-sensitive adhesive layer, such as a pressure-sensitive adhesive sheet, the occasional occurrence of wrinkles during folding can be inhibited without fail.

Those short rollers 8, 8, . . . are preferably those having a surface made of a material having a low coefficient of friction, from the standpoint of reducing friction coefficient. For example, use can be made of polytetrafluoroethylene (hereinafter referred to as PTFE), polyfluoroalkoxyl (hereinafter referred to as PFA), tetrafluoroethylene/hexafluoropropylene copolymers (hereinafter referred to as FEP), and polychlorotrifluoroethylene (hereinafter referred to as CTFE).

Figure 3:
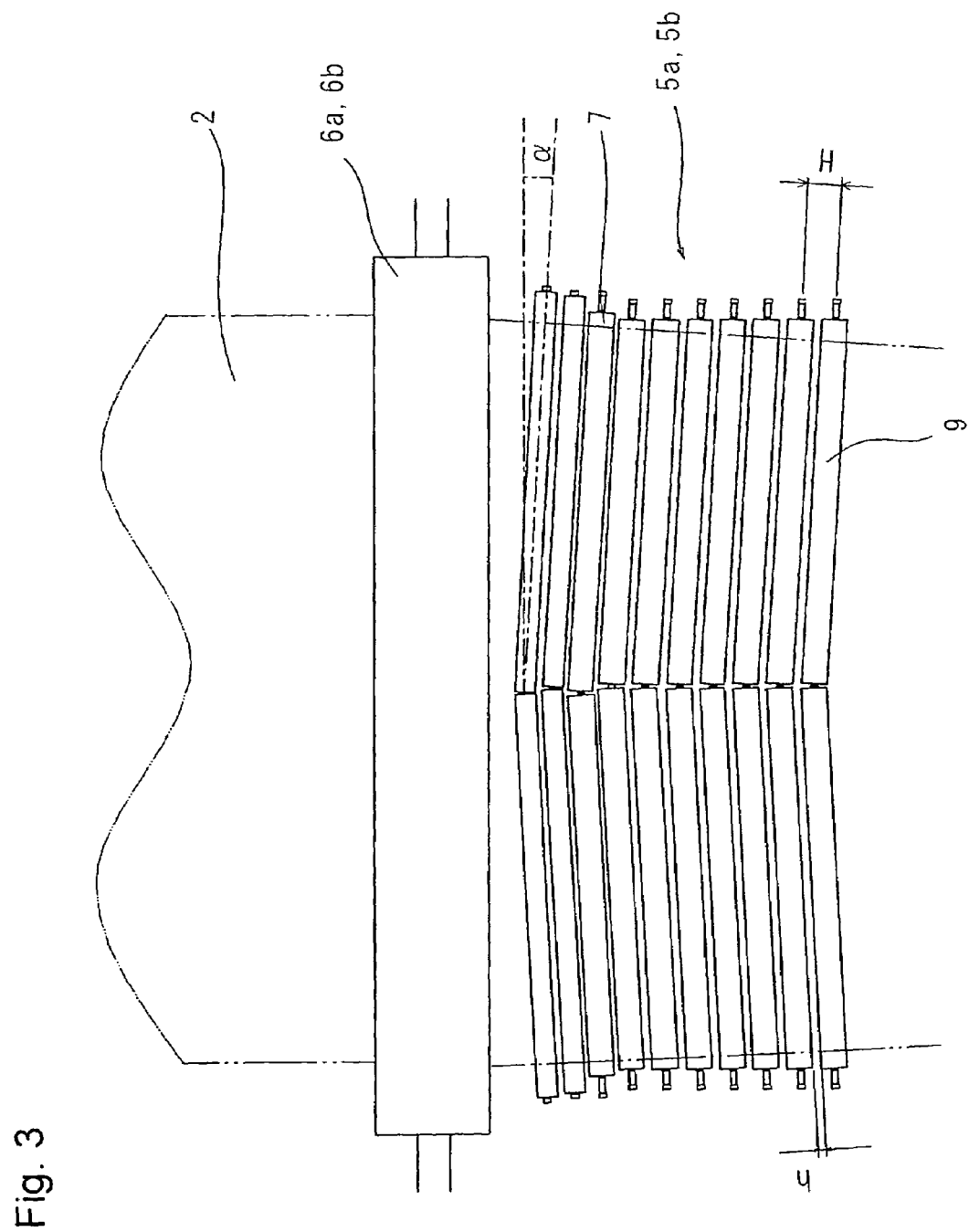
FIG. 3 is a diagrammatic view of another embodiment of the stabilizers in the apparatus for inflation extrusion molding according to the invention.

Furthermore, the roller members 7 should not be construed as being limited to those constituted by the plural short rollers 8, 8, . . . described above. For example, one long roller 9 can be used as the roller member 7 as shown in FIG. 3. When such long rollers 9 are disposed so as to be inclined at a predetermined angle so that the direction of spreading of the resin material 2 is substantially the same as the direction of rotation of the rollers 9 as shown in FIG. 3, then the resin material 2 inflated into a cylindrical shape can be easily spread when deformed into a flat tube shape having an elongated elliptic section and the occasional occurrence of wrinkles in folding can be inhibited, as in the case described above.

The method of inflation extrusion molding with an inflation extrusion molding apparatus having the above described constitution will be explained below.

First, resin material(s) 2 in a molten state is introduced into a die 1 from one or more extruders not shown. The resin material 2 introduced into this die 1 is then extruded upward into a cylindrical shape through annular ejection openings concentrically formed in the die 1. Air is introduced into the cylindrical resin material 2 through an air introduction pipe not shown which has been formed in the die 1 to thereby inflate the resin material 2 into a cylindrical shape (see FIG. 1). The resin material 2 inflated into a cylindrical shape is introduced into the space between stabilizers 5a and 5b facing each other at a predetermined angle, sandwiched therebetween and pressed into a flat tube shape having an elongated elliptic section, and then introduced into the nip between a pair of pinch rollers 6a and 6b while being folded.

In this operation, the resin material 2 is folded while spreading out to both sides of the direction of forward movement, as described above, between the stabilizers 5a and 5b constituted by roller members 7 arranged in rows. Since the direction of this spreading is substantially the same as the direction of rotation of each roller member 7, the resistance of friction between the resin material 2 and each roller member 7 during the spreading is reduced and the resin material 2 is folded without arising troubles such as wrinkles.

The resin material 2 is easily spread between the stabilizers 5a and 5b and the occasional occurrence of wrinkles is inhibited, as described above. Various resin materials can hence be molded. Examples of moldable resins include block, random, or other propylene polymers containing ethylene units as comonomer units, ethylene polymers such as low-density, high-density, and linear low-density ethylene polymers, polystyrene, polyesters, and olefin polymers which are copolymers of ethylene and other monomer(s), such as ethylene/methyl methacrylate copolymers. Examples thereof further include styrene/isoprene/styrene block copolymers (SIS), styrene/butadiene/styrene block copolymers (SBS), styrene/isoprene block copolymers (SI), styrene/butadiene block copolymers (SB), styrene/ethylene-propylene/styrene block copolymers (SEPS), styrene/ethylene-butylene/styrene block copolymers (SEBS), styrene/ethylene-butylene-propylene block copolymers (SEP), styrene/ethylene-butylene block copolymers (SEB), styrene/ethylene-butylene/olefin crystal block copolymers (SEBC), olefin crystal/ethylene-butylene/olefin crystal block copolymers (CEBC), styrene/isobutylene/styrene block copolymers (SIBS), styrene/butadiene random copolymers (SBR), hydrogenated styrene/butadiene random copolymers (HSBR), ethylene/vinyl acetate copolymers (EVA), ethylene/propylene rubbers (EPR), and ethylene/propylene/α-olefin rubbers. These materials may be used singly or as a mixture of two or more thereof.

Besides being usable for molding various resin materials as described above, the method of inflation extrusion molding is applicable even to a sheet having a pressure-sensitive adhesive layer on one side, such as, e.g., a pressure-sensitive adhesive sheet. A pressure-sensitive adhesive sheet having no wrinkles can be formed by the method. In the case where a pressure-sensitive adhesive sheet is produced by this method, the following materials may be used. First, examples of resin materials serving as a pressure-sensitive adhesive include styrene/isoprene/styrene block copolymers (SIS), styrene/butadiene/styrene block copolymers (SBS), styrene/isoprene block copolymers (SI), styrene/butadiene block copolymers (SB), styrene/ethylene-propylene/styrene block copolymers (SEPS), styrene/ethylene-butylene/styrene block copolymers (SEBS), styrene/ethylene-butylene-propylene block copolymers (SEP), styrene/ethylene-butylene block copolymers (SEB), styrene/ethylene-butylene/olefin crystal block copolymers (SEBC), olefin crystal/ethylene-butylene/olefin crystal block copolymers (CEBC), styrene/isobutylene/styrene block copolymers (SIBS), styrene/butadiene random copolymers (SBR), hydrogenated styrene/butadiene random copolymers (HSBR), ethylene/vinyl acetate copolymers (EVA), ethylene/propylene rubbers (EPR), and ethylene/propylene/α-olefin rubbers. These materials may be used singly or as a mixture of two or more thereof.

For further improving pressure-sensitive adhesive properties, a tackifier (tackifier resin) may be added to the resin material. As the tackifier can be used one or more appropriate members selected from known tackifiers for use in pressure-sensitive adhesives, such as, e.g., petroleum resins of the aliphatic type, aromatic type, aliphatic/aromatic copolymer type, or alicyclic type, coumarone-indene resins, terpene resins, terpene-phenol resins, alkylphenol resins, rosin resins, polymerized rosin resins, xylene resins, and resins obtained by hydrogenating these resins. Also, there may be used one or more appropriate softeners selected from, for example, low-molecular polyisobutylene, polybutene, polyisoprene, polybutadiene, hydrogenated polyisoprene, hydrogenated polybutadiene, derivatives of these which have a reactive group, e.g., an OH group, COOH group, or epoxy group, at one or each end thereof, process oils, naphthenic oil, castor oil, linseed oil, soybean oil, phthalic ester plasticizers, phosphoric ester plasticizers, and liquid aliphatic petroleum resins.

A mixture of the resin material serving as a pressure-sensitive adhesive and the tackifier resin, etc. and a resin material serving as a substrate are introduced into the die 1 from respective separate extruders. The resin material serving as a substrate is, for example, a block, random, or other propylene polymer containing ethylene units as comonomer units, ethylene polymer, e.g., a low-density, high-density, or linear low-density ethylene polymer, polystyrene, polyester, olefin polymer which is a copolymer of ethylene and other monomer(s), e.g., an ethylene/methyl methacrylate copolymer, styrene/isoprene/styrene block copolymer (SIS), styrene/butadiene/styrene block copolymer (SBS), styrene/isoprene block copolymer (SI), styrene/butadiene block copolymer (SB), styrene/ethylene-propylene/styrene block copolymer (SEPS), styrene/ethylene-butylene/styrene block copolymer (SEBS), styrene/ethylene-butylene-propylene block copolymer (SEP), styrene/ethylene-butylene block copolymer (SEB), styrene/ethylene-butylene/olefin crystal block copolymer (SEBC), olefin crystal/ethylene-butylene/olefin crystal block copolymer (CEBC), styrene/isobutylene/styrene block copolymer (SIBS), styrene/butadiene random copolymer (SBR), hydrogenated styrene/butadiene random copolymer (HSBR), ethylene/vinyl acetate copolymer (EVA), ethylene/propylene rubber (EPR), or ethylene/propylene/α-olefin rubber. Thereafter, the two resin materials introduced into the die 1, i.e., the resin material serving as a pressure-sensitive adhesive and the resin material serving as a substrate, are extruded together through the annular openings formed in the die 1 so that the resin material serving as a pressure-sensitive adhesive forms an outer layer. The reason why a pressure-sensitive adhesive layer is formed as an outer layer is that this constitution prevents the inside surfaces of the resultant pressure-sensitive adhesive sheet from sticking to each other upon folding between the stabilizers 5a and 5b.

Various resin materials including the folded pressure-sensitive adhesive sheet are taken up with a pair of pinch rollers and then wound up with a winding machine not shown. In the operation for winding with a winding machine, each edge parts of the folded sheet may be cut off, whereby two separate sheets can be obtained.

As described above, according to the method of inflation extrusion molding of the invention, various resin materials including a pressure-sensitive adhesive sheet can be molded as high-quality film or sheet products free from wrinkles.

EXAMPLES

The method of inflation extrusion molding according to the invention will be illustrated in more detail by reference to the following Examples, in which pressure-sensitive adhesive sheets were produced as examples of the product, but the invention should not be construed as being limited thereto.

Example 1

A resin material for substrate formation consisting of 100 parts by weight of a resin mixture composed of 80% by weight low-density polyethylene and 20% by weight ethylene/octene-1 copolymer having a density of 0.882 g/cm$^3$, 4 parts by weight of titanium oxide, and 0.2 parts by weight of natural silica (average particle diameter, 5.0 μm), and 100 parts by weight of a styrene/ethylene-butylene/styrene polymer serving as a pressure-sensitive adhesive were separately fed to the resin feed openings of respective 60-mm (diameter) screw extruders. The extruder for a pressure-sensitive adhesive and the extruder for a substrate were operated at revolution speeds of 15 rpm and 140 rpm, respectively, to eject these resin materials into a die 1. The die 1 had a diameter of 400 mm and had two annular ejection openings concentrically formed therein, and each ejection opening had a gap of 3.0 mm. These resin materials were molded by coextrusion under the conditions of a set temperature for the extruder for a pressure-sensitive adhesive of 220° C. on the average, a set temperature for the extruder for a substrate of 180° C. on the average, and a set temperature for the die 1 of 220° C. The resin materials which had been molded by coextrusion and inflated into a cylindrical shape were passed through the space between stabilizers 5a and 5b regulated so as to have an angle of aperture θ (see FIG. 1) of 24°. Each stabilizer comprised: roller rows (first roller members 7a) arranged in an 8-stage stack with a pitch $H_1$ of 55 mm to give a gap $h_1$ between adjacent first roller members 7a of 9 mm, in which each row was composed of 56 short PTFE rollers having a width of 17 mm and a roller diameter of 46 mm; and roller rows (second roller members 7b) arranged in a 2-stage stack with a pitch $H_2$ of 50 mm to give a gap $h_2$ between the two second roller members 7b of 12 mm, in which each row was composed of 90 short PTFE rollers having a width of 12 mm and a roller diameter of 38 mm. The gap b between the lower second roller member 7b and the uppermost first roller member 7a was set at 8 mm. The short rollers constituting the roller rows (the first roller members 7a and the second roller members 7b) were disposed in zigzag arrangement relative to the short rollers of adjacent roller rows, and each row was disposed symmetrically about the center of the row so as to have an angle of inclination α (see FIG. 2) of 6°. The inflated resin material tube was thus formed into a flat tube shape having an elongated elliptic section and folded. As a result, two pressure-sensitive adhesive sheets each having a thickness of 110 μm and a width of 1,350 mm could be obtained. These sheets each were free from surface wrinkles and substantially even in thickness, and were high-quality pressure-sensitive adhesive sheets.

Example 2

A resin material for substrate formation consisting of 100 parts by weight of a resin mixture composed of 75% by weight low-density polyethylene and 25% by weight ethylene/octene-1 copolymer having a density of 0.882 g/cm$^3$, 4 parts by weight of titanium oxide, and 0.6 parts by weight of a lubricant, and 100 parts by weight of a styrene/ethylene-butylene random polymer serving as a pressure-sensitive adhesive were separately fed to the resin feed openings of respective 60-mm (diameter) screw extruders. The extruder for a pressure-sensitive adhesive and the extruder for a substrate were operated at revolution speeds of 20 rpm and 150 rpm, respectively, to eject these resin materials into a die 1. The die 1 had a diameter of 400 mm and had two annular ejection openings concentrically formed therein, and each ejection opening had a gap of 3.0 mm. These resin materials were molded by coextrusion under the conditions of a set temperature for the extruder for a pressure-sensitive adhesive of 200° C. on the average, a set temperature for the extruder for a substrate of 180° C. on the average, and a set temperature for the die 1 of 200° C. The resin materials which had been molded by coextrusion and inflated into a cylindrical shape were passed through the space between the same stabilizers 5a and 5b as in Example 1. The inflated resin material tube was thus formed into a flat tube shape having an elongated elliptic section and folded. As a result, two pressure-sensitive adhesive sheets each having a thickness of 110 μm and a width of 1,350 mm could be obtained. These sheets each were free from surface wrinkles and substantially even in thickness, and were high-quality pressure-sensitive adhesive sheets.

Example 3

A resin material for substrate formation consisting of 100 parts by weight of a resin mixture composed of 70% by weight low-density polyethylene and 30% by weight ethylene/octene-1 copolymer having a density of 0.902 g/cm$^3$, 4 parts by weight of titanium oxide, and 0.1 part by weight of a weathering agent, and 100 parts by weight of a propylene copolymer serving as a pressure-sensitive adhesive were separately fed to the resin feed openings of respective 60-mm (diameter) screw extruders. The extruder for a pressure-sensitive adhesive and the extruder for a substrate were operated at revolution speeds of 15 rpm and 100 rpm, respectively, to eject these resin materials into a die 1. The die 1 had a diameter of 400 mm and had two annular ejection openings concentrically formed therein, and each ejection opening had a gap of 3.0 mm. These resin materials were molded by coextrusion under the conditions of a set temperature for the extruder for a pressure-sensitive adhesive of 220° C. on the average, a set temperature for the extruder for a substrate of 190° C. on the average, and a set temperature for the die 1 of 220° C. The resin materials which had been molded by coextrusion and inflated into a cylindrical shape were passed through the space between the same stabilizers 5a and 5b as in Example 1. The inflated resin material tube was thus formed into a flat tube shape having an elongated elliptic section and folded. As a result, two pressure-sensitive adhesive sheets each having a thickness of 110 μm and a width of 1,350 mm could be obtained. These sheets each were free from surface wrinkles and substantially even in thickness, and were high-quality pressure-sensitive adhesive sheets.

Example 4

The same resin materials as in Example 1 were molded under the same conditions as in Example 1, except that the stabilizers used were ones arranged so as to have an angle of aperture θ (see FIG. 1) of 24° and each consisting of rollers arranged in a 11-stage stack in which each roller had a roller diameter of 46 mm and an axial length of 1,600 mm and the rollers were disposed symmetrically about the center of the stabilizer (as shown in FIG. 3) so as to have an angle of inclination α (see FIG. 2) of 6°. As a result, two pressure-sensitive adhesive sheets each having a thickness of 110 μm and a width of 1,350 mm could be obtained. These sheets each were free from surface wrinkles and substantially even in thickness, and were high-quality pressure-sensitive adhesive sheets.

Comparative Example

The same resin materials as in Example 1 were molded under the same conditions as in Example 1, except that the stabilizers used were ones arranged so as to have an angle of aperture θ (see FIG. 1) of 24° and each consisting of single-axis rollers arranged in a 11-stage stack in which each roller was made of an acrylonitrile/butadiene rubber (NBR) and had a roller diameter of 46 mm and an axial length of 1,550 mm. As a result, two pressure-sensitive adhesive sheets having a thickness of 110 μm and a width of 1,350 mm could be obtained. However, these sheets each had surface wrinkles which had been formed occasionally.

While the present invention has been described in detail and with reference to specific embodiments thereof, it will be apparent to one skilled in the art that various changes and modifications can be made therein without departing from the spirit and scope thereof.

The present application is based on Japanese patent application No. 2003-324534 filed Sep. 17, 2003, the contents thereof being herein incorporated by reference.

What is claimed is:

1. A method of inflation extrusion molding, comprising:
   introducing one or more resin materials extruded from one or more extruders into a die;
   subsequently extruding the resin material(s) from the die and inflating the extrudate into a cylindrical shape having a predetermined diameter by blown-film extrusion; and then
   passing the cylindrical inflated resin material through a space between stabilizers which face each other at a predetermined angle, to deform the cylindrical resin material into a flat tube shape having an elongated elliptic section, thereby producing a film or sheet having a predetermined width,
   wherein the deformation of the cylindrical inflated resin material into a flat tube shape having an elongated elliptic section is assisted by a guide device to thereby facilitate the deformation,
   wherein the stabilizers each comprise roller members arranged in rows and the roller members each are arranged so that the direction of rotation thereof is substantially the same as the direction in which the cylindrical inflated resin material is spread when deformed into a flat tube shape having an elongated elliptic section, to thereby serve as the guide device, and
   wherein each roller member contains rollers disposed to form a zigzag configuration with the rollers in the other roller members.

2. The method of inflation extrusion molding of claim 1, wherein the roller members each comprise a plurality of rollers arranged in a row.

3. An apparatus for inflation extrusion molding, comprising:
   a die into which one or more resin materials extruded from one or more respective extruders are introduced, and subsequently from which the introduced one or more resin materials are extruded and inflated into a cylindrical shape having a predetermined diameter by blown-film extrusion; and stabilizers facing each other at a predetermined angle and defining a space therebetween through which the cylindrical inflated resin material is passed to be deformed into a flat tube shape having an elongated elliptic section, thereby producing a film or sheet having a predetermined width, wherein the stabilizers comprises roller members arranged in rows, and the roller members each are arranged so that the direction of rotation thereof is substantially the same as the direction in which the cylindrical inflated resin material is spread when deformed into a flat tube shape having an elongated elliptic section, and wherein each roller member contains rollers disposed to form a zigzag configuration with the rollers in the other roller members.

4. The apparatus for inflation extrusion molding of claim 3, wherein the roller members arranged in rows are arranged so as to give a gap between adjacent roller members of not larger than the diameter of each roller member.

5. The apparatus for inflation extrusion molding of claim 3, wherein the roller members each comprise a plurality of rollers arranged in a row.

6. A process for producing a pressure-sensitive adhesive sheet, comprising:

extruding a resin material for forming a pressure-sensitive adhesive layer and a resin material for forming a substrate from respective separate extruders;

introducing the extrudates into a single die;

subsequently extruding the introduced resin materials together from the die;

inflating the extrudate into a cylindrical shape having a predetermined diameter by blown-film extrusion; and then passing the cylindrical inflated resin materials through a space between stabilizers which face each other at a predetermined angle, to deform the cylindrical materials into a flat tube shape having an elongated elliptic section, thereby producing a pressure-sensitive adhesive sheet having a predetermined width, wherein the deformation of the cylindrical inflated resin materials into a flat tube shape having an elongated elliptic section is assisted by a guide device to thereby facilitate the deformation, wherein the stabilizers comprise roller members arranged in rows and the roller members each are arranged so that the direction of rotation thereof is substantially the same as the direction in which the cylindrical inflated resin materials are spread when deformed into a flat tube shape having an elongated elliptic section, to thereby serve as the guide device, and wherein each roller member contains rollers disposed to form a zigzag configuration with the rollers in the other roller members.

7. The process for producing a pressure-sensitive adhesive sheet of claim 6, wherein the roller members each comprise a plurality of rollers arranged in a row.

8. The apparatus for inflation extrusion molding of claim 4, wherein the roller members each comprise a plurality of rollers arranged in a row.

\* \* \* \* \*